Aug. 11, 1931.  H. C. SCOTT  1,818,652
SACK CHUTE
Filed July 17, 1928  3 Sheets-Sheet 1
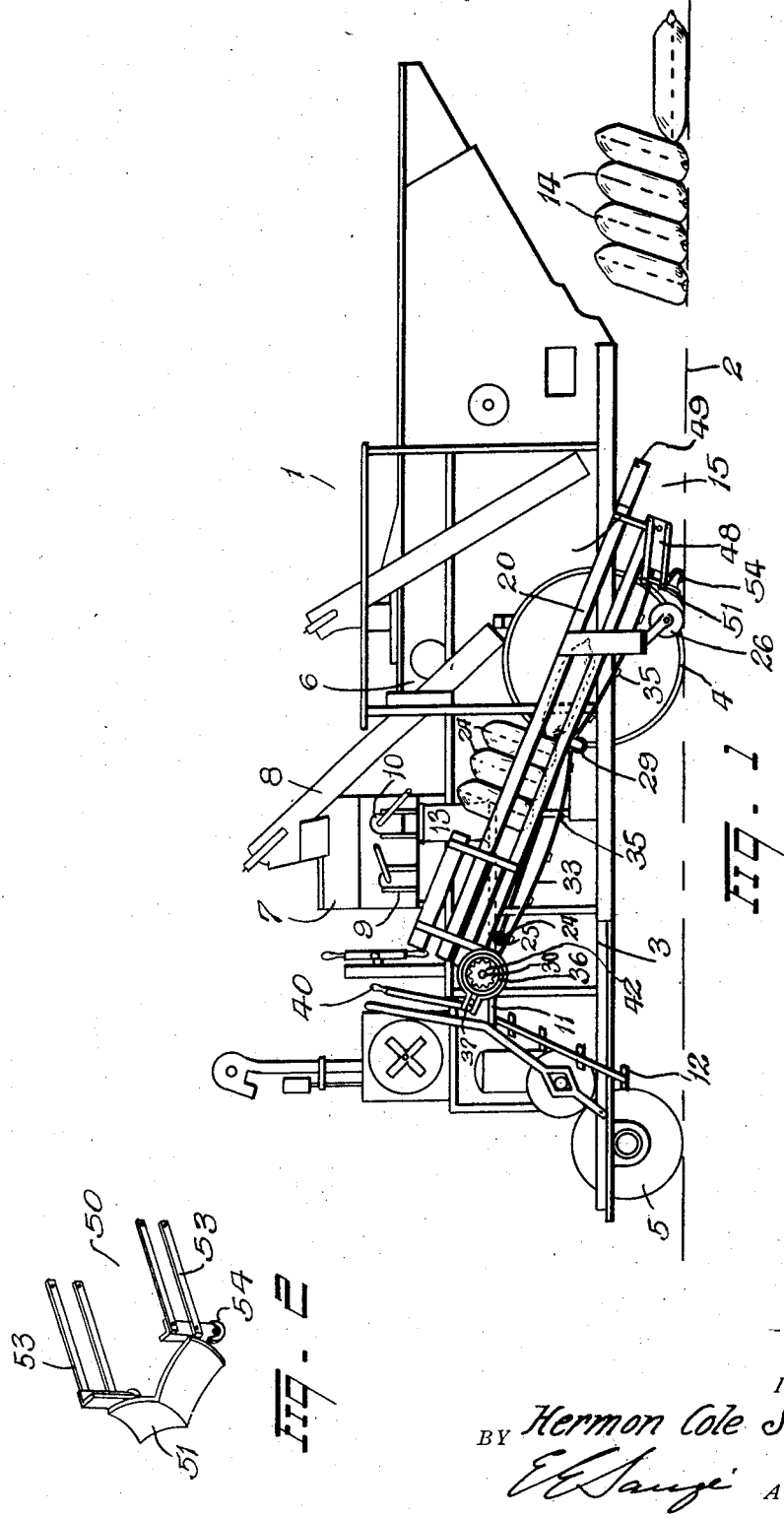
INVENTOR
BY Hermon Cole Scott
ATTORNEY

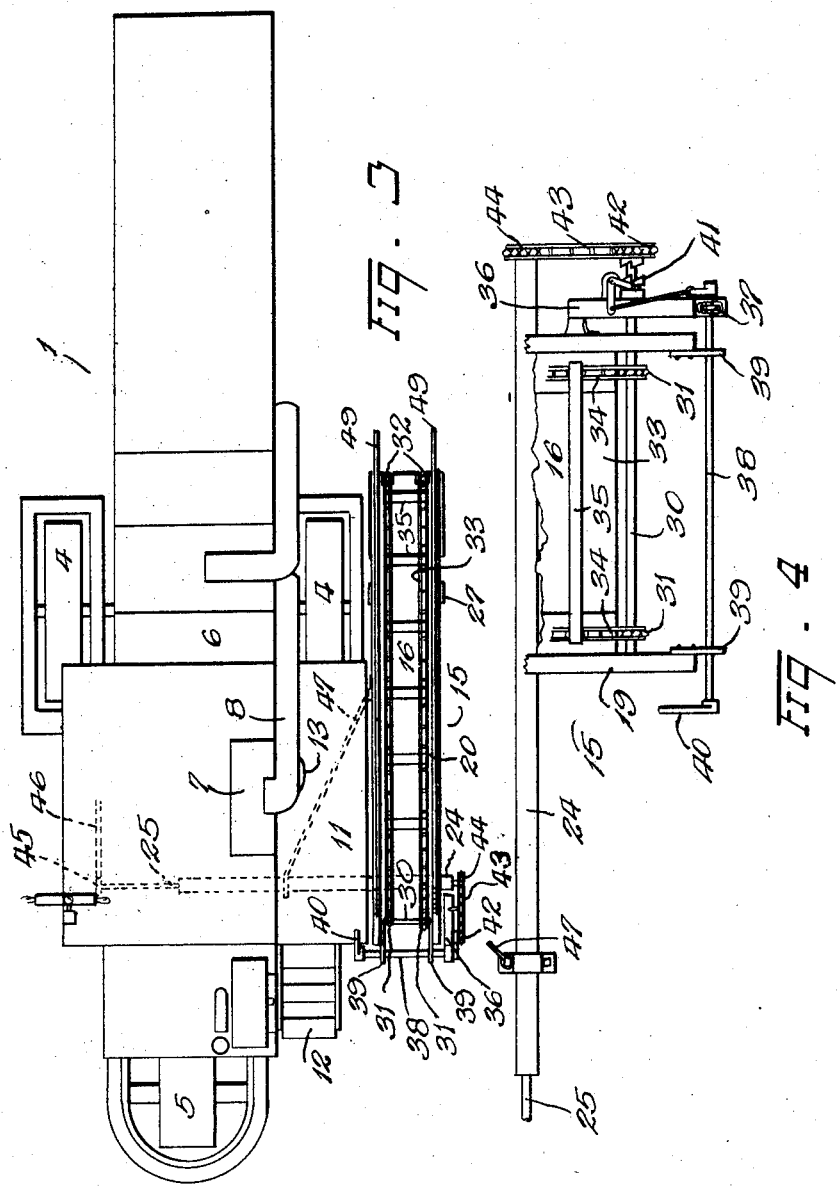

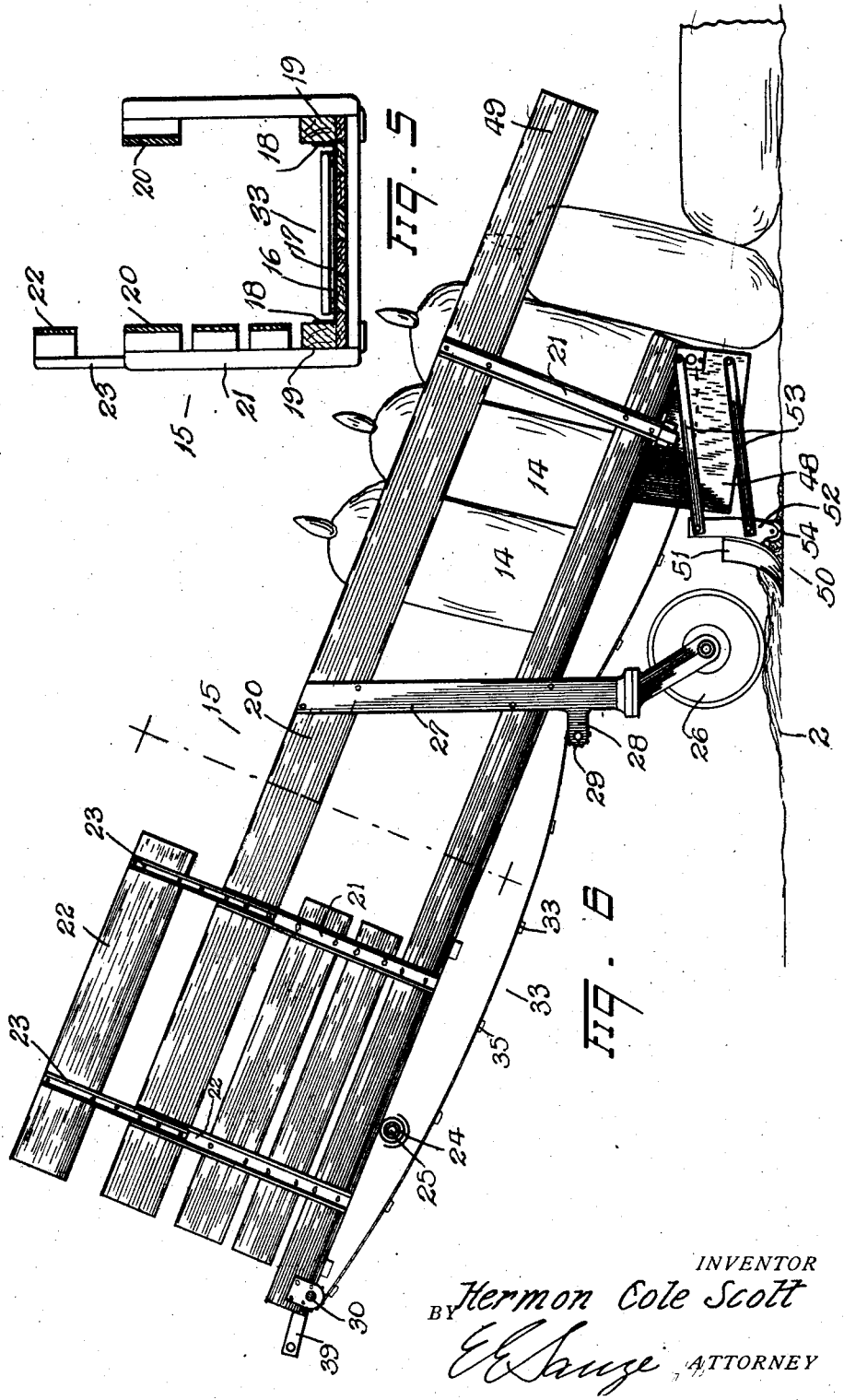

Patented Aug. 11, 1931

1,818,652

UNITED STATES PATENT OFFICE

HERMON COLE SCOTT, OF POMEROY, WASHINGTON

SACK CHUTE

Application filed July 17, 1928. Serial No. 293,369.

This invention relates to sack chutes, more particularly adapted to grain harvester use, and has as one of its objects to provide a sack chute that will deposit the filled sacks of grain in an erect position in the field, thereby providing a marker locating the deposited sacks and causing a saving as where the sacks are deposited flat and in high stubble much loss occurs from oversight when finally loading the sacks for delivery.

Another object of the invention is to provide a sack chute that will prevent loss by breakage of the sacks in loading the chute, as when their unrestrained movement in the chute is suddenly arrested by contact with the end gate.

A further object of the invention is to provide a sack chute that will deposit the sacked grain in a manner that the broader side of the sacks are protected from the sun's rays, thus preventing loss by drying out the wheat contained in the sacks, and also afford greater protection against rain.

A further object of the invention is to provide a sack chute that will save time and labor in loading the deposited sacks of grain on to a wagon or other conveyance for delivery.

A further object of the invention is to provide a sack chute that will ordinarily carry an excess number of sacks of grain by their erect position in the chute, over the standard number of five, and that may be constructed of greater length to provide for greater carrying capacity due to the method of supporting its lower end and to its forced drive mechanism.

A further object of the invention is to provide a sack chute that will automatically provide a level place upon which to deposit the sacked grain.

With these and other objects in view reference is now had to the accompanying drawings in which Fig. 1 is a side elevation of a harvester showing the application of the sack chute;

Fig. 2 is a perspective view (enlarged) of the ground leveller;

Fig. 3 is a plan view of the harvester and sack chute;

Fig. 4 is a plan view (enlarged) of a fragment of the sack chute showing the operating mechanism;

Fig. 5 is an enlarged view of a cross section of the device showing constructional details; and Fig. 6 is an enlarged side elevation of the chute, with part of its operating mechanism removed, and showing the application of the tail guide and the operation of the ground levelling device.

Having reference to the drawings like numerals refer to like parts throughout the several views and the numeral 1 refers to a harvester, which in this case will be used to typify any mobile apparatus capable of movement relative to its supporting structure, and upon which the device to be described is applicable, with the supporting structure in this case being the earth 2.

This apparatus will be described as comprising a frame 3, supported by wheels consisting of main wheels 4 and a pilot wheel 5, and on the frame is mounted a housing 6 of the usual character.

Upon the upper part of the housing is mounted a sacker 7 which sacker is supplied with grain from the interior of the machine by means of an elevator, represented as at 8, and the sacker is provided with the usual gates, one of which 9 is shown closed while the other of which 10 is shown open.

Below the sacker is provided a platform 11 having steps 12 for obvious reasons, and upon this platform the sack-sewer is stationed for the purpose of sewing the sacks as each sack 13, placed there for the purpose, is filled from the sacker 7 in the usual manner of such operation.

To take care of the filled and sewed sacks 14 and for the purpose of depositing them upon the ground in convenient series for future gathering and loading into trucks for delivery at some pre-determined destination, a chute 15 is provided and this chute consists of a floor 16 having an armored bottom 17, the armor comprising preferably a sheet metal plate extending throughout the length of the chute while side strips 18 of tough and smooth material are secured against the sills 19 to prevent wear, with the armor providing a smooth surface having a minimum frictional resistance that might obstruct the movement of the sacks of grain as they are loaded on to the chute from the platform 11 to be moved down the chute for final deposit.

To maintain the sacks in their proper position on the floor of the chute side boards 20 are provided which are positioned perpendicularly to the bottom and these side boards extend throughout the length of the chute and are supported by uprights 21 secured to the bottom of the chute for the purpose.

At the upper end of the chute the side boards form a more or less complete wall wherewith to stop the sack as it lodges on the chute and for the purpose of accommodating the chute to various sizes and kinds of machines, an extension member 22 is provided which consists of an extra side board raised above the original side board on the outer side of the chute and having braces 23 adapted for vertical sliding adjustment and securement in the uprights 21 holding the side boards 20 and these extensions permit the introduction of sacks thereinto in an arrangement providing a buttress sack forming a slidable end gate, and marker sacks, the latter by positioning one or more of said sacks in a generally erect position.

The chute is supported in a novel manner by means of a beam 24 secured rigidly to and extended laterally from the harvester to provide a pivotal support for the upper end of said chute, and to provide for adjustment of the chute thereon, and this beam is preferably hollow to accommodate a shaft 25, for a purpose to be explained, and the lower end of the chute carries a castor wheel 26 which is secured to the chute in any suitable manner and by which the discharge end of the chute will be supported and maintained in fixed relation to the ground. In the present instant the support for said castor wheel consists of arms 27 (one only of which is shown) and these arms extend upwardly to provide added braces for the side board, and these arms are further provided with brackets 28 adapted to support a roller 29 wherewith to guide a conveyor which will be presently explained.

It is well known that apparatus of this kind is adapted for operation on uneven ground and side hills and as an illustration of the wide scope of its adaptability to the purpose intended, it will be recognized that with the apparatus on the low side of the hill and with the chute on the upper side that the chute will attain a more or less horizontal or level position, and in extreme cases an elevated position, a position in which gravity will oppose or practically have no effect upon the sacks placed in the chute, and that the reverse is true when the chute is on the low side which will provide for a maximum inclination of that member and a maximum gravity effect. To place the sacks 14 under control at all times while they are in the chute, an operating means is provided which consists of a driving shaft 30 suitably mounted in the upper end of the chute and provided with sprocket wheels 31 with an idle roller or sprocket wheels 32 similarly mounted in the lower end of the chute over which sprocket wheels a continuous conveyor 33 is trained for sliding movement over the armored bottom of said chute, and this conveyor consists preferably of a pair of link belts 34 having slats 35 secured thereto at spaced intervals thereon.

The driving shaft 30 is extended outwardly and has mounted thereon a brake 36 preferably operated by means of a cam 37 in the usual manner, the cam being mounted on a shaft 38 which in turn is supported by arms 39 attached to the chute and upon which is provided an operating lever 40 positioned in convenient reach of the sewer.

When the chute has considerable inclination whereby gravity will tend to move the sacks downward in the chute the brake 36 may be utilized alone to control the movement of the conveyor and hold the sacks until the required number are placed in the chute and to permit the total number to move simultaneously upon release of the braking mechanism. Where it is desired to operate the device where conditions render the device practically level, a clutch 41 is provided on the drive shaft 30, as shown in Fig. 4, and this clutch is arranged to operate with the braking mechanism whereby when the brake is released the clutch will become engaged and the drive shaft will be driven, by a sprocket wheel 42 preferably, a chain belt 43 being associated with this sprocket wheel and passed about a second sprocket wheel 44, the latter sprocket wheel 44 being secured to the shaft 25 that is mounted in the supporting beam 24, which beam obviously is the pivotal center of the chute. This shaft 25 carries on its opposite end a sprocket 45 or other wheel which with its respective belt 46 is connected to any suitable part of the mechanism (not shown) for the purpose of communicating the power of the apparatus to the operating mechanism.

With this association of parts, it is now obvious that the sacks 14 of grain are under the positive variable control of the sack sewer at all times. While an operating lever 40 is shown for this purpose for manual operation, it is obvious that the device may be adapted to foot operation, if desired, and it is also obvious that while the usual number of sacks deposited at a time is five that the number of sacks handled by this chute will be only limited by its length due to its ample supporting means, in addition to the position of the sacks therein. To prevent strain upon the supporting beam in moving around corners, a diagonal brace 47 is provided which is movably mounted on the beam at one end and which has its other end securely attached to the chute whereby any disposition to change the relative position of the lower end of the chute and the harvester will be prevented by this brace. Obviously, other bracing means may be used if desired, the intent of the bracing being to prevent lateral movement of the lower end of the chute, or a tendency to cramp on the beam.

It is well known that when grain is harvested that the heads of grain are removed from the stalks and that as it is desirable that very little straw pass through the harvester with the heads, hence much of the stalks will remain standing in the field, and as these stalks are liable to become entangled in the lower end of the conveyor, a protecting shoe 48 is provided which is secured to the lower end of and on the under side of the floor 16 of the chute 15, to encase the idle roller 32 and the lower portion of the conveyor 33, thereby protecting it against any extraneous matter, and to offer as little resistance as possible to the moving apparatus the lower side of the shoe 48 is given a slight upward inclination, in a general parallel position with respect to the chute, to permit it to more readily pass over matter which might do harm to either the conveyor or the shoe itself.

As one of the main objects of this device is to deposit the sacks 14 in an upright position and to provide means for their continuance in that position after being deposited, so that they provide a marker that may be observed in the stubble, a means is provided for that purpose which consists first of a tail guide 49 provided by continuing the side boards 20 beyond the end of the chute thereby to slidably engage and guide the sack to maintain its erect position from transverse tipping during the period of time it is leaving the end of the chute and until it rests upon the ground, and, as the natural tendency of the sack would be to fall over were it deposited on a steep side hill, a levelling means 50 is provided wherewith to provide a laterally level resting place for the sacks, which levelling means consists of a cutting blade 51 positioned preferably near the end of the chute, and this cutting blade is supported by upright arms 52 to which latter is attached preferably parallel arms 53 extended rearward for pivotal attachment to the shoe whereby the cutting blade may be raised or lowered and maintained in a cutting position, and these upright arms 52 are provided with guiding wheels 54 adapted to control the vertical movement of the levelling means independent of the vertical movement of the chute.

In use the sacks are loaded on to the chute by a swinging movement whereby the sack first strikes the extension member of the side board, the first sack being manipulated to fall upon its side to form a buttress against which subsequently deposited sacks will rest both in the chute and after deposit. The subsequent sacks are then placed in the chute in a similar manner except as to position, the latter sacks being deposited in an erect position supported as above mentioned by the first sack the latter sacks forming markers that by remaining standing after deposit will indicate the position of each pile of sacks in the field by projecting above the stubble.

Upon the deposit of the first sack the conveyor is moved either by gravity or the mechanical means as above set forth, to a distance the width of two sacks when in an erect position. Two sacks are then placed in the chute in the erect position when these three sacks are permitted to move a similar distance of two sacks, and (where five sacks are used as a load) two additional sacks are then placed to complete the load.

As some little time elapses between the deposit of any two sacks and as it is possible to hold one or two or more sacks on the platform, the sacks are not deposited until an opportune time and when that opportune time occurs, the operating mechanism is released by the operating lever and the sacks are moved downward toward the end of the chute.

The first sack now passes over the end of the chute and falls upon its side on the levelled ground, prepared for the purpose by the ground leveller 50, and as soon as this sack is deposited, the second sack is moved over the end of the chute and gradually comes to rest upon the ground and against the first sack, being maintained steady by the tail guide assisted by the pressure of the following sacks during the dropping movement, and during the time necessary for the tail guide to pass free of the sack. The following sacks then continue to fall in a like manner and the first sack of a new series may be deposited upon the chute at any time after the first three sacks have left the chute. For this purpose, for instance, and with two sacks remaining on the chute, the first sack may be deposited, to then move down the distance of two sacks necessary to deposit the remaining two sacks and preparatory to receiving the second and third sacks of a new series.

Having thus described my invention, I claim:

In a sack chute the combination with a mobile apparatus, and a chute pivotally attached thereto, of means to maintain the discharge end of said chute in fixed relation to the ground, during the travel of said apparatus, side boards attached to said chute, and positioned at a height above said chute approximating that of an erect sack, to provide a guideway for the erect sacks of a load, and extended beyond the discharge end of the chute to provide a tail guide, said tail guide being disposed, with respect to the ground to maintain a height approximating that of a sack resting erect on the ground, a vertically adjustable extension member attached to the other side of said chute to support a sack transversely and erect, at the point and time of introduction into said chute, utilizing the first sack introduced, and laid down, as a buttress and means to forcibly and successively advance the loaded sacks, during the loading operation, a distance to permit loading successive sacks, one at a time, and to continue the advance of the entire load when completed, to deposit the load from the end of the chute, sack by sack, to the ground, maintaining the erect position of the sacks during discharge by means of the said tail guide.

In testimony whereof I affix my signature.

HERMON COLE SCOTT.